(12) United States Patent
Griner et al.

(10) Patent No.: US 6,614,729 B2
(45) Date of Patent: Sep. 2, 2003

(54) SYSTEM AND METHOD OF CREATING DIGITAL RECORDINGS OF LIVE PERFORMANCES

(76) Inventors: David D. Griner, 11106 Oak Knoll Dr., Austin, TX (US) 78759; James C. Griner, 23916 57th Ave. SE, Woodinville, WA (US) 98072

(*) Notice: Subject to any disclaimer, the term of this patent is extended or adjusted under 35 U.S.C. 154(b) by 119 days.

(21) Appl. No.: 09/964,269
(22) Filed: Sep. 26, 2001
(65) Prior Publication Data US 2002/0051407 A1 May 2, 2002

Related U.S. Application Data (60) Provisional application No. 60/235,517, filed on Sep. 26, 2000.
(51) Int. Cl.[7] ............................. H04B 1/20; G10H 7/00
(52) U.S. Cl. ............................... 369/1; 369/83; 84/602
(58) Field of Search ............................. 369/1, 2, 3, 5, 369/4, 7, 8, 30.05, 30.19, 83, 84; 84/609, 602, 603, 604, 626; 700/87

(56) References Cited

U.S. PATENT DOCUMENTS 6,434,103 B1 * 8/2002 Shitara et al. ................. 369/83

* cited by examiner

Primary Examiner—Ali Neyzari
(74) Attorney, Agent, or Firm—David D. Griner; Randall W. Burton; Erik Nordstrom (57) ABSTRACT

In one embodiment, the present invention provides an event recording system that has an event-capture module, an editing module, and a media recording module. The event-capture module captures an event signal, such as an audio signal from a sound event, and transforms the signal into a primary event file that is accessible as it is being formed. The editing module is communicatively connected to the event capture module. It accesses and parses the primary event file into one or more digital track files that can be recorded onto a recording media. Likewise, the media recording module is communicatively linked to the editing module for receiving the one or more digital track files from the editing module. The media recording module has a plurality of media recorders for simultaneously recording the one or more digital track files onto a plurality of recording media. This allows a plurality of recording media, with the entire event recorded upon each media, to be available shortly after the event has ended.

5 Claims, 6 Drawing Sheets

SYSTEM AND METHOD OF CREATING DIGITAL RECORDINGS OF LIVE PERFORMANCES

This specification and application specifically references and incorporates by reference U.S. Provisional Application No. 60/235,517 entitled "System and Method of Creating Digital Recordings of Live Performances" which was filed on Sep. 26, 2000.

TECHNICAL FIELD OF THE INVENTION

The present invention relates generally to the field of producing digital audio and video recordings of live performances.

BACKGROUND OF THE INVENTION

The invention described herein represents a significant improvement in both the speed at which recordings of live performances can be mass-produced and in the costs of producing such recordings.

Today, the usual medium for distribution of audio recordings is a Compact Disc or CD—which is simply a data storage device which contains audio information stored according to the Red Book standard. Typically, whenever recordings of a live performance are produced for public distribution (such as when a recording artist releases a live CD) the audio portion of the live performance is captured on some type of audio storage device such as an analog multi-track tape recorder.

The resulting tape recording is then mixed, edited, and broken into discrete tracks at a recording studio. This process, often referred to as audio mastering, might include signal processing to optimize song levels to commercial (radio broadcast) standards, compression, normalization, equalization, fades, noise reduction, and any digital editing needed to maximize the sonic quality of the recordings. Typically, audio mastering takes place in a recording studio under the direction of a sound engineer. The process normally requires access to the entire, completed audio recording since many of the customary editing steps—such as normalization, equalization, or adjustment of peak levels—require a comparison of each song or discrete track to the rest of the recording. These global editing steps are also very time consuming. Digital processing of an audio file involves complex algorithms and can often take longer than the actual playing time of a given song or track.

After the audio mastering process is complete, the resulting audio tracks are recorded onto some type of digital media and used to make a glass master with the information stored as pits and lands. The glass master is then used to make the actual CDs, which contain pits and lands corresponding to the original glass master and which are coated with a metallic surface to allow a laser to interpret these pits and lands as a digital signal. The entire CD production process can take months and cost tens or even hundreds of thousands of dollars. Obviously, this system is simply not practical for producing relatively small numbers of recordings of a performance or for producing the recordings quickly.

It is also possible to record a live performance onto recordable optical media such as recordable compact disks (CD-R). Using this type of data disk, information can be written onto the disk after manufacture. CD-R drives capable of storing digital audio onto blank CD-R disks are readily available for use with personal computers. In the typical CD-R disk, a flat plastic substrate is plated with a metallic surface and covered with a dye layer. The dye has the property that when exposed to an appropriate, strong laser light, it changes state. In one state, it is nearly transparent to infrared; in the other, it is more nearly opaque. A CD-R drive is capable of recording information onto the CD-R blank. Thereafter, the information can be read using virtually any type of CD drive, including drives or players intended solely for audio CDs.

The use of CD-R disks to store the recording of a live performance would have a significant advantage over the use of traditional audio CDs in terms of manufacturing time. However, the time required to perform the audio mastering would remain unchanged. Further, since each CD-R blank must be recorded individually in a CD-R drive, the time required to produce significant copies and the sheer numbers of CD-R drives which would be required to produce a significant number of copies would still be commercially unacceptable.

The invention described herein overcomes these shortcomings and—if widely adopted—has the potential to greatly impact two of the most significant problems facing the music and recording industry today.

First, the invention could virtually eliminate unauthorized recordings of live concerts or performances—often referred to as "bootleg recordings." Although such recordings were relatively rare a decade ago, advances in technology have turned bootlegging into big business—and a big problem for the recording industry. Smaller and better recording devices, digital audio formats which allow unlimited copying with no loss of quality, and low-cost CD-R drives have combined to turn bootlegging into a multimillion dollar activity. Although exact numbers are difficult to determine (since bootlegging is an illegal underground activity in many countries) it is estimated that the entire bootlegging industry generates hundreds of millions of dollars annually. The Recording Industry Association of America estimates that the combination of bootlegged concerts and counterfeit recordings of released CDs cost the recording industry 300 million dollars annually in lost sales.

In addition to the sales losses, bootlegs compete for shelf space and sale with authorized recordings in many record shops. Artists also cannot control the quality of bootleg recordings being released in their name. And of course, bootleggers do not pay royalties to the artists. And finally, the consumer may sometimes be deceived into buying a bootleg CD inadvertently. Some bootlegs have copycat packaging or misleading descriptions, and often there is no indication that the recordings are unauthorized.

The invention described herein has the potential to virtually eliminate the problem of illegal bootlegs. Obviously, bootleggers would have very few customers if higher quality legal recordings of the concerts were available.

A second problem addressed by the invention, is the highly publicized problem of online music trading. The use of file-swapping programs like Napster allows literally millions of individuals worldwide to freely trade music rather than buy it. As on-line trading of music becomes more common, performing artists and record companies may have to derive a greater percentage of their income from live performances. In addition to the revenue generated by ticket prices, a large portion of that income will likely come from concert merchandise, such as the T-shirts and posters now available at nearly every live performance.

A tremendous market already exists for this sort of concert merchandise. It is estimated that the top 100 concert tours in the U.S. alone generate $400 million in music merchandise, not including the price of admission. Some musical performers average as much as $15 per person in merchandise sales.

The invention discussed here has the potential of further enhancing the merchandise revenue stream already available to the performer. The rapid growth of the bootlegging industry shows that there is already a large market for live concert recordings. Widespread use of the invention would allow artists and record companies to tap into this market as a way of offsetting CD sales lost due to the on-line trading of music files.

SUMMARY OF THE INVENTION

One object of the invention is to provide a method and system for efficiently recording a live event such as a musical concert onto a large number of media so that they may be provided to attendees of the event shortly after it has ended.

In accordance with one embodiment of the invention, the different steps in the processes of editing and recording are overlapped with the performance itself and with each other to allow all of the steps to be completed only a short time after the performance is concluded.

In accordance with another embodiment of the invention, during the recording process, small discrete portions of a primary event file (for example one minute segments of the performance) are copied to smaller time-indexed secondary digital files. This allows the digital tracks (possibly corresponding to individual songs) to be easily assembled. It also helps insure all of the important audio signals are included in the final recording and also that none of the audio signal is included within two different tracks.

In accordance with another embodiment of the invention an automated process can be applied to calculate track length. This process greatly facilitates the assembly of secondary files into digital tracks.

In accordance with another embodiment of the invention, the various editing steps performed on each digital track are automatically applied to successive digital tracks. This greatly simplifies and speeds up the mastering process.

In accordance with still another embodiment of the invention, automatic recording media changers are used to allow each recorder to write a track to multiple blank recording media while the next track is being mastered (and while successive tracks are actually being performed). The preferred type of recording media changer will normally vary depending upon the type of recording media or disk 330 that is used. If, for example, where CD-R disks are used as the recording media, a preferred type of recording media changer could be either of two commercially available CD changers, including carousel-type changers commonly seen with audio CD players or the multiple spindle-fed auto-changers commonly used in automated CD duplication systems. The use of one or more recording media changers greatly reduces the number of CD-R drives required and serves to decrease equipment requirements.

In one particular embodiment, the present invention provides an event recording system that has an event-capture module, an editing module, and a media recording module. The event-capture module captures an event signal, such as an audio signal from a sound event, and transforms the signal into a primary event file that is accessible as it is being formed. The editing module is communicatively connected to the event capture module. It accesses and parses the primary event file into one or more digital track files that can be recorded onto a recording media. Likewise, the media recording module is communicatively linked to the editing module for receiving the one or more digital track files from the editing module. The media recording module has a plurality of media recorders for simultaneously recording the one or more digital track files onto a plurality of recording media. This allows a plurality of recording media, with the entire event recorded upon each media, to be available shortly after the event has ended.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes as the present invention. It should also be realized by those skilled in the art that such equivalent constructions do not depart from the spirit and scope of the invention as set forth in the appended claims.

DETAILED DESCRIPTION OF THE PREFERRED EMBODIMENTS

The invention and system described herein allows digital recordings, such as audio CD-R disks, of a live performance to be available for distribution only moments after the conclusion of the performance. A central feature in one embodiment of the invention is the overlap of the performance itself with the initial recording of the performance, the editing processes, and the transfer of the resulting digital files to digital media. This process allows edited digital recordings to be created during the performance, and a final complete recording to be almost immediately available. The utility of the invention is most apparent in the context of live musical performances, but it is also applicable to speeches, training programs, plays and theatrical performances, and any other type of audio and visual performance. The invention can also be readily applied to the production of digital video recordings to accompany the audio portion of the performance.

Figure 1:
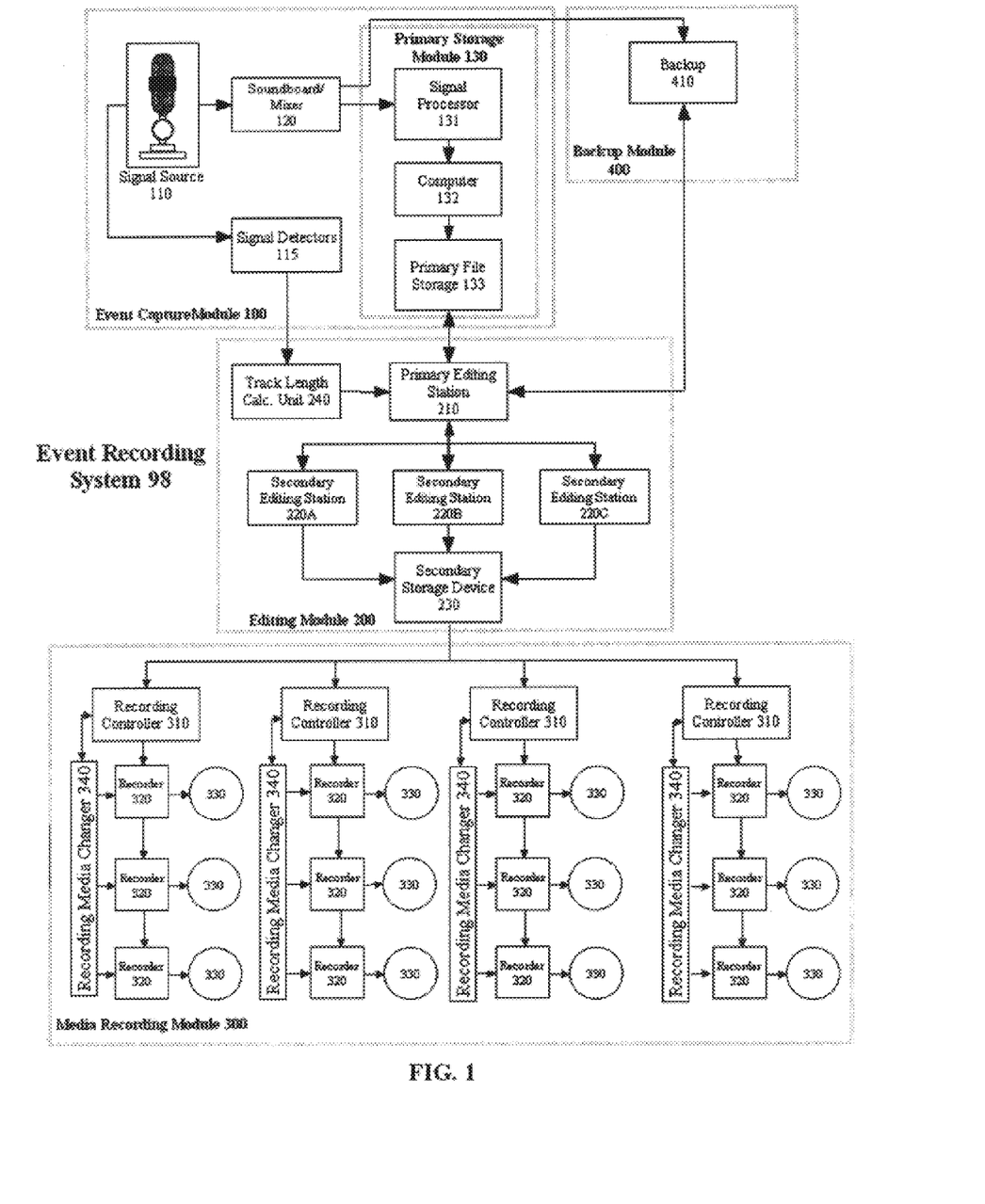
FIG. 1 shows a preferred embodiment of the present invention.

FIG. 1 depicts a preferred embodiment of an event recording system 98 for carrying out the present invention. The event recording system depicted in FIG. 1 includes an event capture module 100, editing module 200, media recording module 300, and backup module 400. The event-capture module 100 captures the audio and/or video recording of an event, such as a musical performance. The event-capture module 100 saves the audio and/or video recording as an unedited, digital primary event file and makes it available to the editing module 200 even as it is being captured and saved.

The editing module 200 edits and parses the primary event file into digital track files that are amenable for recording onto the recording media. This editing can include, for example, the audio mastering of a digital audio signal. The editing module 200 includes one or more editing stations that can simultaneously edit different and possibly overlapping portions of the primary event file in order to generate the various track files as the event is occurring.

The media-recording module 300, which includes a multiplicity of media recorders such as CD-R drives, simultaneously records the track files onto the desired media within the multiplicity of media recorders. Several passes of media recording can occur until sufficient numbers of event-recorded media have been produced.

The backup module 400 is connected to the event-capture and editing modules for redundantly saving the event and making it available to the editing module 200 in case the primary event file(s) within the event-capture module 100 becomes damaged or otherwise inaccessible.

Event-capture module 100 generally includes one or more event signal sources 110, a soundboard/mixer 120, and a primary storage module 130. The soundboard/mixer 120 receives one or more event (e.g., audio) signals from signal source 110, which may actually comprise multiple signal sources. The soundboard/mixer 120 processes and combines these signals to generate an output event signal that is in a desired format such as in the form of a two-channel stereo signal. The primary storage module 130 is connected to the soundboard/mixer 120 for receiving and storing the output event signal into the primary event file. Event storage module 100 can also include signal detectors 115.

In the depicted embodiment, primary storage module 130 includes a signal processor 131, a computer 132, and a primary file storage device 133. Signal processor 131 receives and performs any necessary processing on the event output signal to make it operably available to computer 132. For example, it may convert the event output signal from an analog to a digital signal. Signal processor 131 may comprise, for example, any computer sound card capable of high quality A/D conversion. Computer 132 stores the digital event output signal into the primary file storage device 133 as the primary event file. The primary file storage device 133 can include any suitable device such as a high capacity, multi-head disk storage device or a sufficiently large (both in quantity and bandwidth) RAM array.

Editing module 200 generally includes a primary editing station 210, a number of secondary editing stations 220, a secondary storage device 230 (such as another high capacity, multi-accessible disk storage drive), and a track length calculation unit 240.

Recording module 300 generally includes a number of recording controllers 310, a number of suitable recorders 320, and suitable recording media 330. In a preferred embodiment, the recording controllers 310 could be a suitable number of computers, each with a suitable high capacity, multi-head disk storage device or hard drive. Each computer would control multiple CD-R drives, which would serve as the recorders 320, and each CD-R drive would contain a blank CD-R disc, which would serve as the media 330. As the editing process for each digital track file is completed in the editing module 200, the completed digital track files would be copied to the hard drive of each recording controller. The completed digital track files would then be burned onto blank CD-R discs by the CD-R recorders in a manner conforming to the Red Book standard for audio CDs. Although the recording media in this preferred embodiment are CD-R disks, any form of digital recording media capable of recording digital audio and/or video could be used.

Finally, backup module 400 generally includes a suitable secondary backup device 410 to create a backup recording of the performance, such as one or more redundant digital event recording devices (such as DAT recorders) or analog recording devices (such as multi-track tape recorders).

Figure 2:
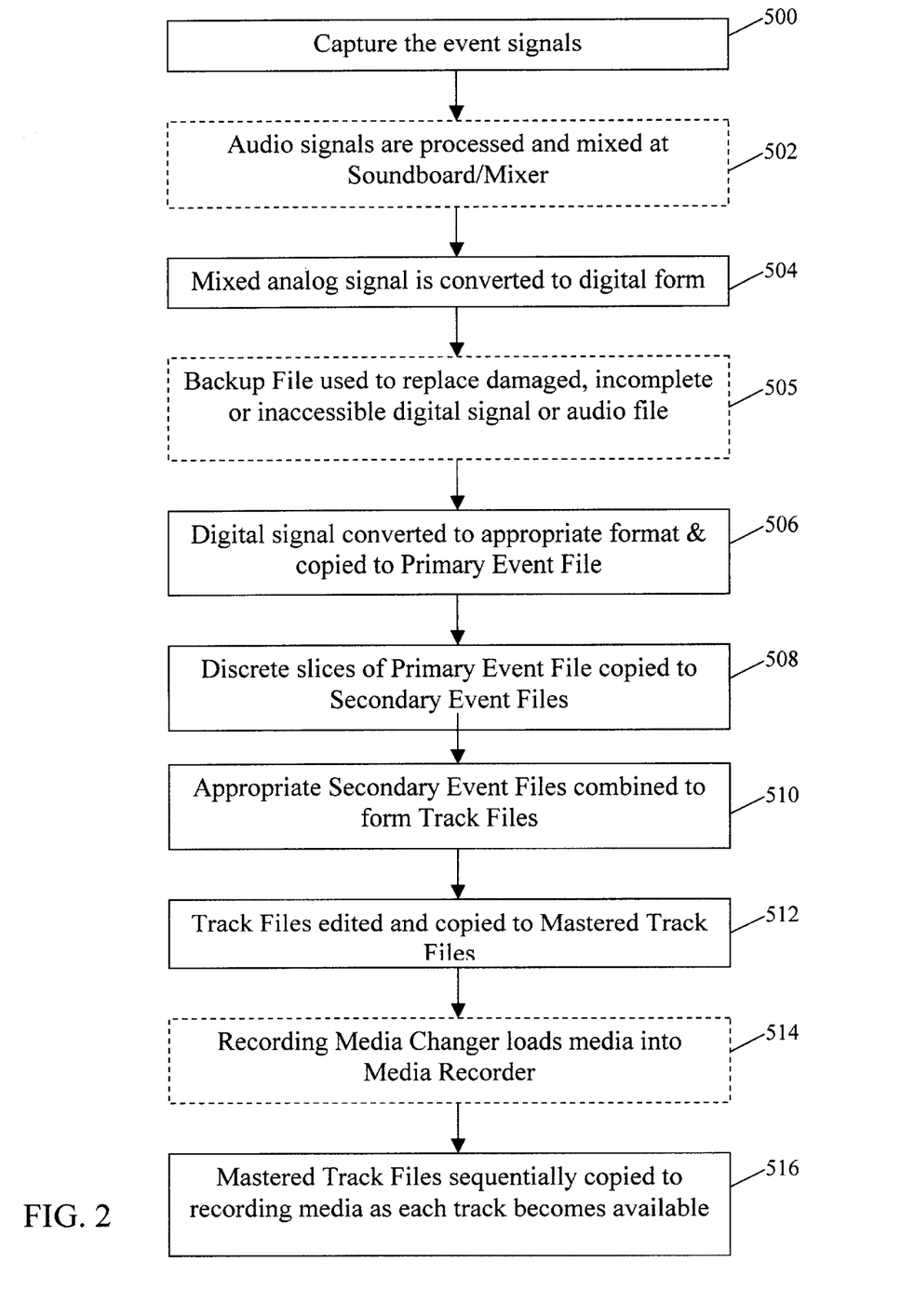
FIG. 2 is a flowchart showing the steps of a preferred embodiment of the present invention.

FIG. 2 is a flowchart showing the steps of a preferred embodiment of the present invention. In Step 500, the event signals from a performance are captured by way of a suitable number of sensors (e.g., microphones for an audio event, video cameras for a video event) appropriately situated at the performance venue. In optional step 502, if necessary these event (e.g., audio) signals from various microphones are mixed at soundboard/mixer 120. In step 504, the resulting mixed analog signal is transmitted to primary storage module 130 via signal processor 131 which converts the mixed analog signal is converted to digital form.

In optional step 505, the secondary backup file created by secondary backup device 410 can be used in the event the primary event file becomes damaged or otherwise inaccessible. The primary event file can be used as an additional backup in case any of the secondary event files or track files become damaged or otherwise inaccessible within the event recording module 100. The backup file is Step 505 can be performed after step 504 if the secondary backup file is required, or after step 506 if the primary event file is utilized.

In step 506, the mixed digital signal is copied to primary file storage device 133 as the primary event file. If necessary, the digital signal is converted to an appropriate format. For example, if the signals are to be recorded onto CD-R discs, the digital signal contained within these secondary event files can be converted to conform with the Red Book standard for CD-quality sound (44.1 kHz sampling at 16 bits resolution in two channels). The digital processing and creation of the primary event file continues throughout the performance, and the resulting completed primary event file will be a recording of the entire performance once it has ended.

In Step 508, as the primary event file is being copied onto primary file storage device 133, small discrete portions of the primary event file (for example one minute segments of the performance) are copied to secondary event files—each encompassing a uniform portion of the event—which are also stored on the primary file storage device 133. In Step 510, primary editing station 210 retrieves these secondary event files from the primary file storage device 133 into a digital audio editor. The digital audio editor can be any software program with a suitable graphical interface capable of performing appropriate signal processing functions on digital audio files, combining separate sequential digital audio files into one file (commonly referred to as stitching), saving the resulting digital track files to a specified location, and—if necessary—video integration and synchronization.

Utilizing track length calculation unit 240, the digital audio editor combines the secondary event files corresponding to predefined discrete portions of the performance (such as individual songs) into digital track files with any excess information being deleted. (For example, segments of the discrete portions that are determined to be part of an adjacent digital track file may be removed.) This combination of secondary event files can occur automatically (for example, based upon preset noise levels from the performance audio or from the audience).

In a preferred embodiment, based upon the values obtained from track length calculation unit 240, the appropriate secondary event files are combined and opened for editing by the digital audio editor, and a graphical representation of the resulting audio wavefile is displayed. The values stored by track length calculation unit 240 indicate the most likely time frame for the next (or first) audio track and that portion of the waveform is highlighted. (In another possible embodiment, this combination of secondary event files can be performed manually.) An audio technician will confirm the beginning and end points of track and the digital audio data between those two points will be copied to a sequential numbered digital track file in secondary storage device 230. Once a portion of the overall wavefile is copied to a digital track, that portion of the wavefile is locked so that it cannot be inadvertently repeated in a subsequent track.

In Step 512, the digital track files located in secondary storage device are mastered at secondary editing stations 220 using the digital audio editor—a process which might include signal processing to optimize song levels to commercial (radio broadcast) standards, compression, normalization, equalization, fades, noise reduction, and any digital editing needed to maximize the sonic quality of the recordings. The audio mastering process is accomplished using a digital audio editor. If necessary, mastered audio files can also be integrated and synchronized with video.

Global signal processing commands (for example, effects applied to an entire track such as normalization and equalization) can be preset based upon an earlier sound check, stored in a sound processing storage file on secondary storage device 230, and then applied to each digital track file automatically. Signal processing commands applied by an audio technician can also be stored in the same sound processing storage file and applied to all subsequent digital tracks.

Since the particular signal processing required for a given performance largely results from factors that remain constant throughout a performance (such as the sound adjustment at a mixing board, the particular instruments or microphones used, etc.) the sound processing can be fine tuned as the performance continues. Accordingly, the degree of input from an audio technician that is required for the first few tracks will be much greater than the input required for later tracks. After several tracks have been mastered, the process will be largely automatic from that point on. This process serves to greatly simplifies and speed up the mastering process.

The digital track files are then copied to a different location in the secondary digital recording device 230 as sequentially numbered mastered track files where they are made available to the media recording module 300. The use of multiple secondary editing stations allows multiple audio and/or video technicians to work on different digital track files simultaneously. The digital track files are edited in order, from first to last, with each technician editing the next file in the queue as soon as the previous file is completed.

In Step 516, as the mastered track files become available, they are recopied to an appropriate recording controller 310, such as a computer with a high capacity, multi-head disk storage device or a sufficiently large (both in quantity and bandwidth) RAM array. Each recording controller 310 operates a number of recorders 320. Each recorder 320 writes the digital track files to suitable recording media 330. Once all of the digital track files have been written to recording media 330, the media is then available for distribution.

Depending upon the recording speed of the devices used in the recording module 300, the tracks can either be copied one at a time as each track is completed (for CD-R recorders, this is commonly referred to as Track at Once or TAO) or all at once (commonly referred to as Disc at Once or DAO). The use of TAO recording will mean that only one track must be recorded after the performance is concluded—reducing lag time between the end of the performance and the completion of the digital media recording process to a matter of a few seconds. In a situation where time is not as critical, DAO recording could be used since it provides a more stable recording environment and a smaller gap between tracks.

In a situation where time and equipment costs are even more critical, TAO recording could be used along with an automated or manual process to change CDs after a track recording is completed. In optional Step 514, a recording media changer loads the appropriate recording medium into recorder 320 before a track file is copied. By using a recording media changer and by taking advantage of the fast write speeds available for an appropriate recorder 320, such as a commercially available 20X CD-R drive, a track file can be written to multiple recording media 330 before the next master track file becomes available. For example, if track number 1 (consisting of the audio recording of a four minute song) is currently available, but track number 2 will not be available for 4 minutes, an appropriate media changer could allow one recorder to record track number 1 on up to 13 different recording media (assuming 6 seconds to change recording media). Once track number 2 is available, the recording media changer will allow that track to be sequentially copied onto the same 13 recording media (using TAO recording) while track number 3 is being processed. The use of recording media changers will not only serve to greatly reduce equipment costs, it would also cut down on space requirements since one changer can replace multiple recorders in the media recording process.

Figure 3:
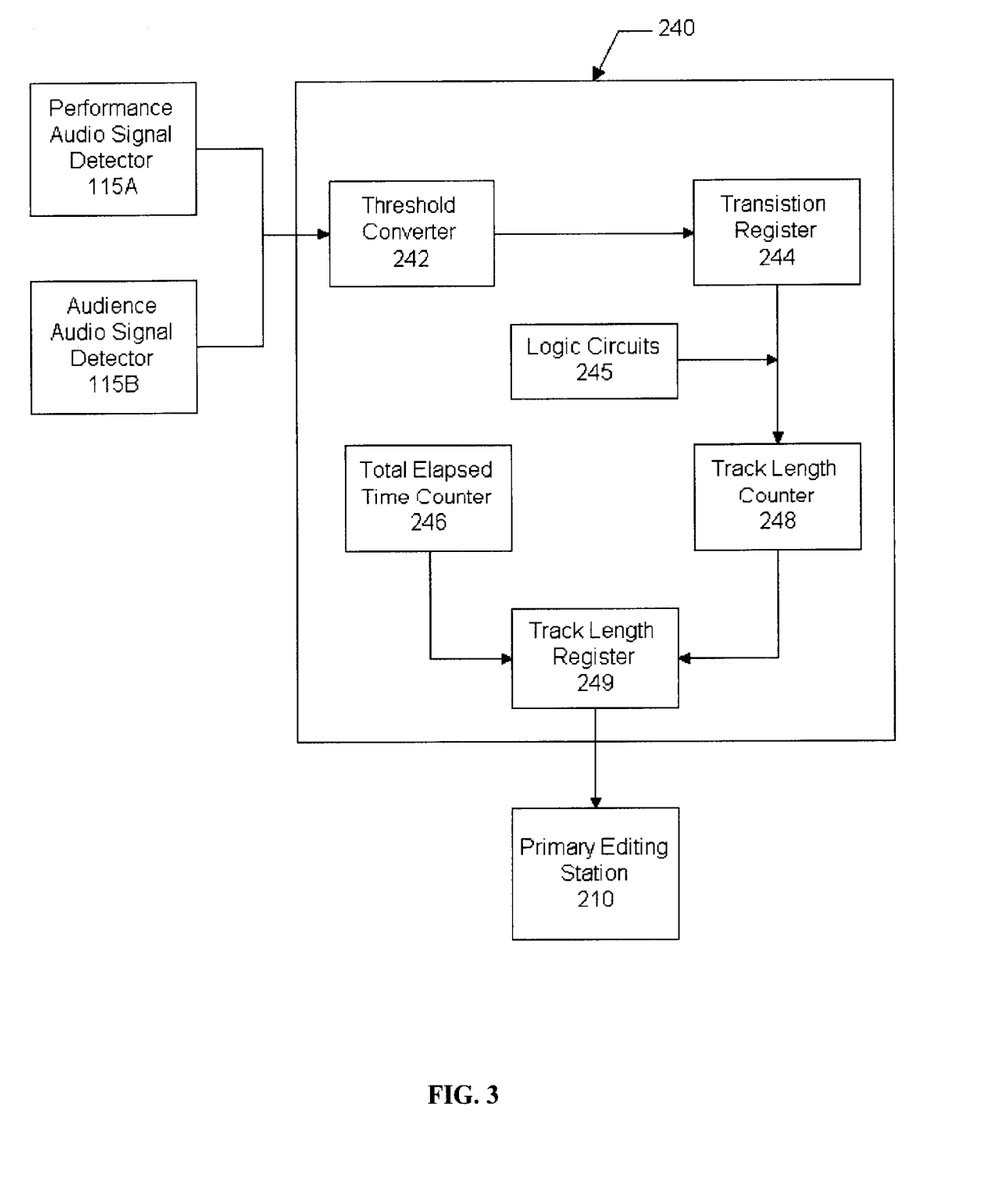
FIG. 3 is a schematic of one embodiment of a track length calculation unit for use with the embodiment shown in FIG. 2.

FIG. 3 shows the components of one possible embodiment of track length calculation unit 240 in more detail. Track length calculation unit 240 comprises a threshold converter 242, a transition register 244, logic circuits 245, a track length counter 248, a total elapsed time counter 246, and a track length register 249.

Figure 4:
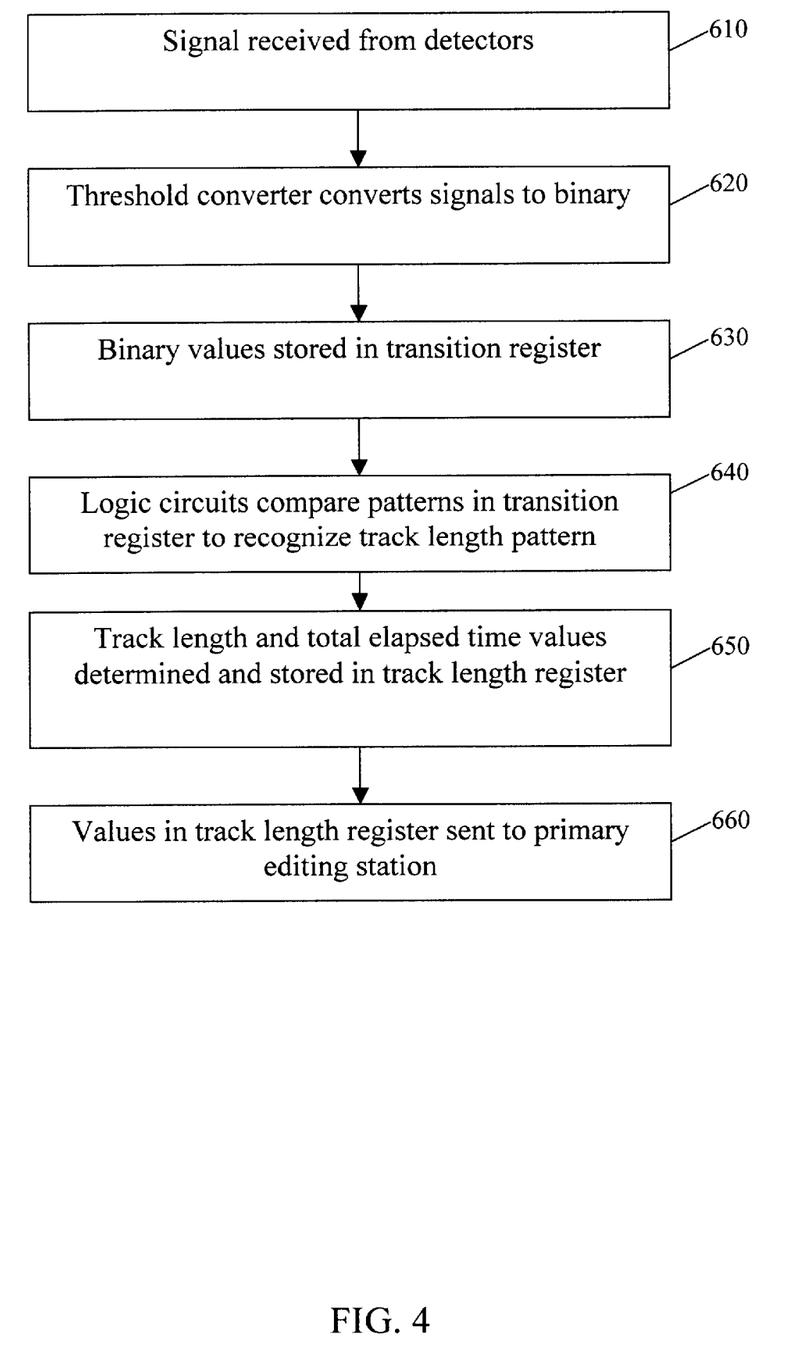
FIG. 4 is a flowchart showing the operation of the track length calculation unit in FIG. 3.

FIG. 4 is a flowchart showing the operation of the track length calculation unit in FIG. 3. In step 610, track length calculation unit 240 begins to receive signals from signal detector 115. In the preferred embodiment of FIG. 3, the signal detectors 115 comprise a performance audio signal detector 115A and an audience audio signal detector 115B. For example, performance audio signal detector 115A could comprise one or more microphones positioned to capture an audio performance and a signal processor capable of converting the microphone output from analog to digital. Audience audio signal detector 115B could comprise one or more microphones positioned to capture audience sounds (audience microphones are often used on performance recordings to make the recording sound "live") and a signal processor capable of converting the microphone output from analog to digital.

To facilitate recognition of the pattern, in step 620 a threshold converter 242 converts the signals from these audio signal detectors to binary values (1 or 0) according to a given threshold established by experiment to determine the average noise levels. The binary values are processed by the transition register 244 in step 630 to determine transition points. The transition register 244 stores the value from the performance audio signal detector and the audience audio signal detector at each time step. Thus a value of (0, 1)

indicates that the digital signal from the performance audio signal detector was low while the digital signal from the audience audio signal detector was high at the corresponding time step (as would be the case between songs while the audience is applauding). Track length counter 248 counts the time between transition points, whereas total elapsed time counter 246 counts time from the beginning of the performance. Logic circuits 245 compare the pattern of transitions with the desired transition pattern to recognize the track length pattern in step 640. The detection of a known signal is common, for example, in the telecommunications art.

In step 650, once the track length pattern is recognized, the total elapsed time at each transition point and the elapsed time between the transition points are stored in the track length register 249 and sent to the primary event editing station 210 in step 660. The track length data allows primary editing station 210 to retrieve and combine the appropriate secondary event files corresponding to predefined discrete portions of the performance (such as individual songs) into digital track files. All of the components of track length calculation unit 240 can be implemented in a field programmable gate array (FPGA), in RAM memory accessed by software executing on primary editing station 210, or through other means known to those skilled in the art of logic design.

The preferred embodiment of track length calculation unit 240 as shown in FIG. 3 uses periods of low signal from performance audio signal detector 115A and high signal from audience audio signal detector 115B (to determine when a performance has paused and the audience is applauding). However, it would also be possible to utilize either the performance audio signal detector 115A or the audience audio signal detector 115B alone. Input from the signal detector(s) could also be replaced with manual input from a technician or even a performer.

Figure 5:
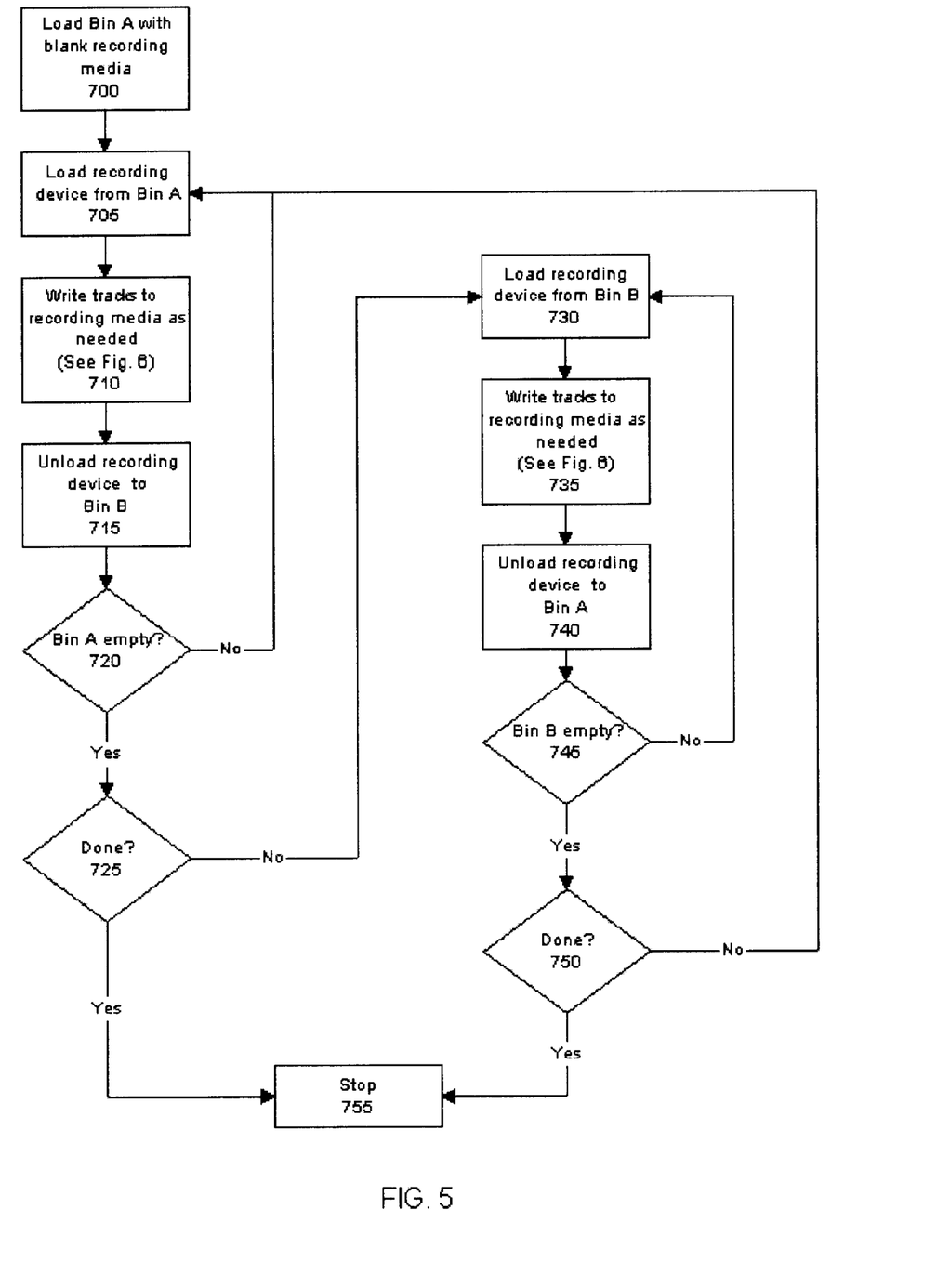
FIG. 5 is a flowchart showing the operation of a preferred embodiment of recording media changer as shown in FIG. 1.

FIG. 5 is a flowchart showing the operation of a preferred embodiment of recording media changer 340. In step 700, location Bin A of a preferred recording media changer (for example, Bin A could be a designated spindle on a commercially available multi-spindle CD autoloader) is loaded with blank recording media (such as blank CD-R disks). In step 705, recording media changer 340 loads a recording medium 330 into recorder 320. In step 710, using the track sequence query shown in FIG. 6, recording controller 310 directs recorder 320 to write all available tracks to the recording medium. The recording medium 330 is then unloaded from recorder 320 and placed in location Bin B (for example, Bin B could be another designated spindle on a commercially available multi-spindle CD autoloader).

Step 720 then determines whether Bin A is empty. If not, the system repeats step 705 and loads another recording medium 330 into recorder 320. If Bin A is empty, in step 725 the system waits for a signal indicating where the media recording process is complete. This signal can be an operator-generated signal that the process is finished, which would cause the operation to stop in step 755.

The signal can also be a wake-up command generated by the presence of a new mastered digital audio track in the appropriate directory of secondary storage device 230. In that case, the process continues to step 730 and reloads a recording medium from Bin B. In step 735, again using the track sequence query shown in FIG. 6, recording controller 310 writes all available tracks to the recording medium. In step 740, the recording medium 330 is then unloaded from recorder 320 and placed in location Bin A.

Step 740 then determines whether Bin B is empty. If not, the system repeats step 730 and loads another recording medium 330 into recorder 320. If Bin B is empty, in step 750 the system waits for a signal indicating where the media recording process is complete. If not, the system returns to step 705 and completes another cycle. This process continues until all mastered digital tracks are recorded onto each recording medium and an operator-generated stop signal is received.

Figure 6:
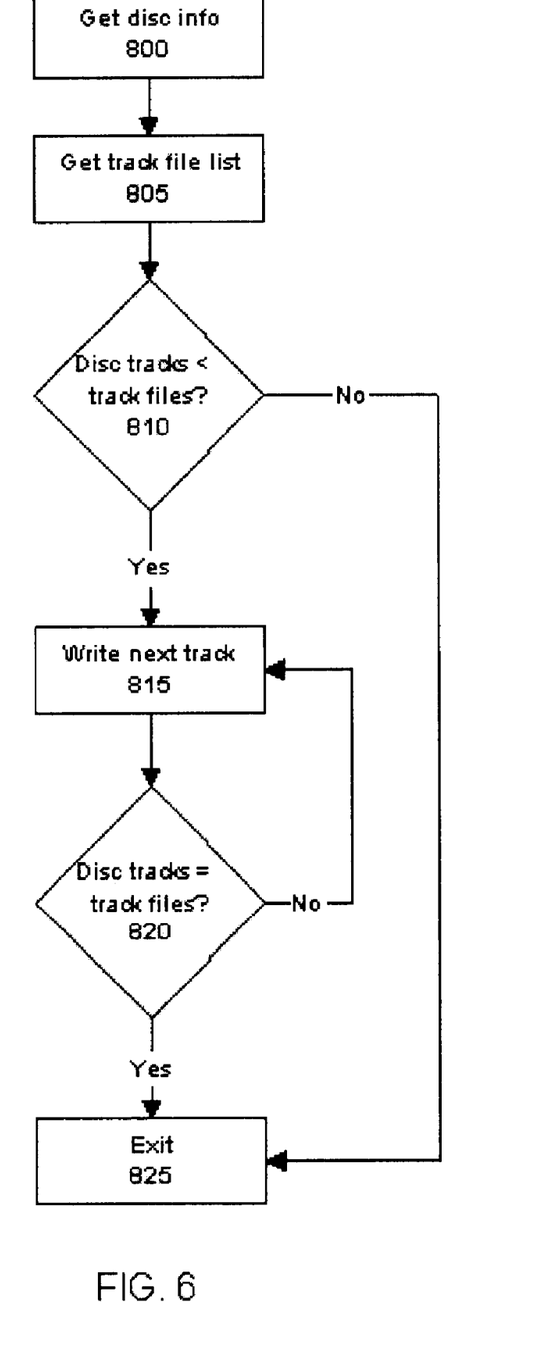
FIG. 6 is a flowchart showing the operation of a preferred embodiment of the track sequence query used in the operation of FIG. 5.

FIG. 6 is a flowchart showing the operation of a preferred embodiment of the track sequence query used by recording controller 310, in steps 710 and 735 of FIG. 5, to determine whether additional tracks are written to the recording media. In step 800, the process begins by querying the recorder 320 to determine the number of tracks already recorded on the currently loaded recording medium. In step 805, the mastered track file directory in secondary storage device 230 is accessed. In step 810, if there are fewer tracks on the recording medium than in the directory, a directive is sent to the recorder 320 to copy the next track in the sequence is copied to the recording medium. In many cases, there may be more than one track not yet copied to a particular recording medium (as when, for example, the mastering process for a given digital track has taken less time than the media recording process for the preceding track.) In that event, this track sequence query would allow two or more files to be copied without changing recording media. Since this would allow a more efficient recording process since the time required to change recording media would not be required, the track sequence query will thus help the recording process catch up whenever it falls behind.

In step 820, if there are still fewer tracks on the recording medium than in the directory, step 815 is repeated. In step 820, once the number of tracks on the recording medium and the number of files in the directory are the same, the process stops at step 825.

The present invention has broad applicability and can provide many benefits as described and shown in the examples above. The embodiments will vary greatly depending upon the specific application, and not every embodiment will provide all of the benefits and meet all of the objectives that are achievable by the invention.

The use of this invention will allow the mass production of event recordings at an extremely rapid pace. Significant numbers of recordings can be available immediately upon the conclusion of the performance. One significant aspect of this invention is the method of overlapping the performance and the editing and recording process to allow for much faster production of the final recorded digital media. Another aspect is the method of copying small discrete portion of the primary event file (for example one minute segments of the performance) to smaller secondary digital files. This allows the digital tracks (possibly corresponding to individual songs) to be easily assembled. It also helps insure all of the important audio signals are included in the final recording and also that none of the audio signal is included within two different tracks. Another aspect of the invention is the use of an automated process to calculate track length. This process greatly facilitates the assembly of secondary files into digital tracks.

Another aspect of the invention is the staggered editing process which allows a number of different editing stations to be utilized to create the final digital tracks, thus helping to insure that all of the finished tracks are available as soon as the performance is completed. Another aspect of the invention is the automatic application of the various audio editing steps performed on each digital track to each successive digital tracks. This greatly simplifies and speeds up the audio mastering process. In still another aspect of the invention, automatic recording media changers are used to allow each recorder to write a track to multiple blank recording media while the next track is being mastered thus greatly reducing equipment requirements.

Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art. For example, the various modules and sub-systems may be implemented with any suitable combination of hardware, software, and human operational intervention. Personal computers, laptops, work stations, client-server systems, or specifically-designed discrete-component machines could be used within the various modules.

Any suitable communications links or network schemes may be used to inter-connect the various components and modules. Furthermore, persons of skill will recognize that not all of the above-described modules and/or stations would be required to implement a sufficiently operational event recording system. For example, in one simple system, the editing module could be omitted. The primary event file could be transferred directly to a media recording module. In this simple embodiment, the track length calculation unit could comprise track delimiters inserted into the event signal by a person at the event (for example, a technician or a performer). Such delimiters could be recognized by either the primary storage computer media recording controllers for parsing up and recording the event into discrete tracks. The resulting media recordings could thus be produced almost completely automatically, without any significant human intervention. This embodiment would allow the creation of small, dedicated systems that could be used by performers in small venues without large investment in either equipment or personnel.

Persons of skill will recognize numerous other embodiments of the invention as presented herein. Accordingly, the present invention is not limited to that which is expressly presented in the specification and drawings.

We claim as follows:

1. An event recording system, comprising:
   (i) an event-capture module to capture an event signal and transform it into a primary event file that is accessible as it is being formed;
   (ii) an editing module communicatively connected to the event capture module, wherein the editing module accesses and parses the primary event file into one or more digital track files that can be recorded onto a recording media; and
   (iii) a media recording module communicatively linked to the editing module for receiving the one or more digital track files, the media recording module having a plurality of media recorders for simultaneously recording the one or more digital track files onto a plurality of recording media.

2. The system of claim 1, wherein the editing module has two or more editing station for simultaneously editing different portions of the primary event file in order to generate the one or more digital track files as the event is occurring.

3. The system of claim 2, wherein the event capture module includes one or more event signal sources, a soundboard with a mixer operably connected to the one or more event signal sources for receiving the event signal therefrom, and a primary storage module for storing the event signal into the primary storage file.

4. The system of claim 1, further comprising a backup module connected to the event capture module for redundantly saving the primary event file and making it available to the editing module in case the primary event file(s) within the event capture module become inaccessible.

5. The system of claim 4, wherein the soundboard receives one or more event signals from the signal source for processing and combining these signals to generate the output event signal that is provided to the primary storage module.

* * * * *

US006614729C1

(12) INTER PARTES REEXAMINATION CERTIFICATE (0010th)

United States Patent
Griner et al.

(10) Number: US 6,614,729 C1
(45) Certificate Issued: Sep. 11, 2007

(54) SYSTEM AND METHOD OF CREATING DIGITAL RECORDINGS OF LIVE PERFORMANCES

(75) Inventors: David D. Griner, Austin, TX (US); James C. Griner, Woodinville, WA (US)

(73) Assignee: Instant Live, LLC, Cambridge, MA (US)

Reexamination Request:
No. 95/000,131, Feb. 14, 2006

Reexamination Certificate for:
Patent No.: 6,614,729
Issued: Sep. 2, 2003
Appl. No.: 09/964,269
Filed: Sep. 26, 2001

Related U.S. Application Data

(60) Provisional application No. 60/235,517, filed on Sep. 26, 2000.

(51) Int. Cl.
*H04H 7/00* (2006.01)
*H04H 9/00* (2006.01)

(52) U.S. Cl. .................. 369/1; 369/83; 84/602
(58) Field of Classification Search .......... 369/1
See application file for complete search history.

(56) References Cited

U.S. PATENT DOCUMENTS

| | | | | |
|---|---|---|---|---|
| 4,466,029 A | * | 8/1984 | Tanaka | 360/72.2 |
| 4,627,001 A | * | 12/1986 | Stapleford et al. | 704/260 |
| 4,757,540 A | * | 7/1988 | Davis | 704/278 |
| 4,851,931 A | * | 7/1989 | Parker et al. | 360/15 |
| 4,868,687 A | * | 9/1989 | Penn et al. | 360/13 |
| 4,974,178 A | * | 11/1990 | Izeki et al. | 715/516 |
| 5,204,969 A | * | 4/1993 | Capps et al. | 704/278 |
| 5,633,839 A | * | 5/1997 | Alexander et al. | 700/234 |
| 5,768,126 A | * | 6/1998 | Frederick | 700/94 |
| 5,792,971 A | * | 8/1998 | Timis et al. | 84/609 |
| 6,389,399 B1 | * | 5/2002 | Yasuda | 704/500 |

OTHER PUBLICATIONS

Exhibit (A): EDAT–Zing Digital Conversion Cards (Telex Form No. ED 20442–3) ("EDAT Brochure"), Jul. 1999.*
Exhibit (B): User Instructions EDAT–Zing Analog to Digital Audio Signal Conversion, EDAT Cassette Mastering and Duplication (Telex Form No. 38109–769 Rev A) ("EDAT Instructions"). Oct. 1999.*
Exhibit (C): CDP–2001 Desktop CD Duplicator (Telex Form No. ED 20466) ("CDP Brochure"), 1998.*
Exhibit (D): EDAT Instructions: Fast EdDit Sound File Editor (Telex form No. 8109–713 Rev C) ("Fast EdDit Manual") Oct. 1999.*
Exhibit (E): Telex EDAT System of Choice for the Little Warehouse (Telex Press Release) ("EDAT Release") Jun. 2, 1998.*

* cited by examiner

*Primary Examiner*—Maid A. Banankhah (57) ABSTRACT

In one embodiment, the present invention provides an event recording system that has an event-capture module, an editing module, and a media recording module. The event-capture module captures an event signal, such as an audio signal from a sound event, and transforms the signal into a primary event file that is accessible as it is being formed. The editing module is communicatively connected to the event capture module. It accesses and parses the primary event file into one or more digital track files that can be recorded onto a recording media. Likewise, the media recording module is communicatively linked to the editing module for receiving the one or more digital track files from the editing module. The media recording module has a plurality of media recorders for simultaneously recording the one or more digital track files onto a plurality of recording media. This allows a plurality of recording media, with the entire event recorded upon each media, to be available shortly after the event has ended.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–5 are cancelled.

\* \* \* \* \*